(12) United States Patent
Harada

(10) Patent No.: US 12,319,093 B2
(45) Date of Patent: Jun. 3, 2025

(54) PNEUMATIC TIRE

(71) Applicant: The Yokohama Rubber Co., LTD., Tokyo (JP)

(72) Inventor: Shunya Harada, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 302 days.

(21) Appl. No.: 17/594,653

(22) PCT Filed: Apr. 6, 2020

(86) PCT No.: PCT/JP2020/015589
§ 371 (c)(1),
(2) Date: Oct. 25, 2021

(87) PCT Pub. No.: WO2020/217964
PCT Pub. Date: Oct. 29, 2020

(65) Prior Publication Data
US 2022/0176748 A1    Jun. 9, 2022

(30) Foreign Application Priority Data
Apr. 26, 2019  (JP) .................................. 2019-086659

(51) Int. Cl.
*B60C 11/03* (2006.01)
*B60C 11/12* (2006.01)

(52) U.S. Cl.
CPC ...... *B60C 11/0302* (2013.01); *B60C 11/0332* (2013.01); *B60C 11/12* (2013.01);
(Continued)

(58) Field of Classification Search
CPC ............ B60C 11/0302; B60C 11/0304; B60C 2011/0381; B60C 2011/0383; B60C 11/0332; B60C 11/11; B60C 11/0306
See application file for complete search history.

(56) References Cited

U.S. PATENT DOCUMENTS 10,864,776 B2  12/2020  Higashiura
2015/0059940 A1*  3/2015  Kouda .................... B60C 11/11
                                                            152/209.8
(Continued)

FOREIGN PATENT DOCUMENTS

CN    107444024 A    12/2017
CN    108725097 A    11/2018
(Continued)

*Primary Examiner* — Cedrick S Williams
*Assistant Examiner* — Thomas Frank Schneider
(74) *Attorney, Agent, or Firm* — Thorpe North & Western

(57) ABSTRACT

In a pneumatic tire, a plurality of first land portions are arrayed adjacent to each other in a tire circumferential direction, and a plurality of second land portions are arrayed adjacent to each other in the tire circumferential direction. Moreover, the first land portions and the second land portions are each arrayed in a staggered manner along a tire equatorial plane. Additionally, the first land portions and the second land portions each include a plurality of through grooves that extend through the land portions and open to a pair of inclined main grooves, and a plurality of blocks defined by the through grooves. The blocks include an innermost center block that is defined as a block closest to the tire equatorial plane. In addition, an edge portion of the innermost center block includes a notch portion that opens to a connection portion of the inclined main grooves.

14 Claims, 7 Drawing Sheets

(52) U.S. Cl.
 CPC . *B60C 2011/0341* (2013.01); *B60C 2011/036* (2013.01); *B60C 2011/0381* (2013.01); *B60C 2011/1213* (2013.01); *B60C 2200/04* (2013.01)

(56) References Cited

U.S. PATENT DOCUMENTS

| | | |
|---|---|---|
| 2016/0288580 A1 | 10/2016 | Higashiura |
| 2017/0297379 A1* | 10/2017 | Higashiura ......... B60C 11/0302 |
| 2018/0093534 A1 | 4/2018 | Ishino |
| 2018/0111421 A1* | 4/2018 | Nagasawa ............... B60C 11/12 |
| 2018/0297414 A1 | 10/2018 | Tahara et al. |
| 2018/0297417 A1 | 10/2018 | Higashiura |
| 2019/0308459 A1* | 10/2019 | Higashiura ........... B60C 11/032 |
| 2020/0114699 A9 | 4/2020 | Higashiura |

FOREIGN PATENT DOCUMENTS

| | | | |
|---|---|---|---|
| EP | 3 075 572 A1 | 5/2016 | |
| EP | 3 231 639 A1 | 10/2017 | |
| EP | 3 315 326 A1 | 2/2018 | |
| EP | 3 305 555 A1 | 11/2018 | |
| EP | 3 401 123 A1 | 11/2018 | |
| JP | 2013-23194 A | 2/2013 | |
| JP | 2013023194 A * | 2/2013 | |
| JP | 2013-023191 A | 4/2013 | |
| JP | 2013-184666 A | 9/2013 | |
| JP | 2015-81076 A | 4/2015 | |
| JP | 2018-177062 A | 11/2018 | |
| JP | 2018-177094 A | 11/2018 | |
| WO | WO-2017092902 A1 * | 6/2017 | ......... B60C 11/0302 |

\* cited by examiner

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| PATTERN CONFIGURATION | FIG. 7 | FIG. 2 | FIG. 2 | FIG. 2 | FIG. 2 | FIG. 2 | FIG. 2 | FIG. 2 |
| NUMBER OF CENTER BLOCKS | 4 | 2 | 2 | 2 | 2 | 2 | 2 | 2 |
| FIRST NOTCH PORTION | NO | YES | YES | YES | YES | YES | YES | YES |
| SECOND NOTCH PORTION | YES | YES | YES | YES | YES | YES | YES | YES |
| $Lb1/La1$ | - | 0.50 | 0.50 | 0.50 | 0.45 | 0.45 | 0.45 | 0.45 |
| $Wc/Wb1'$ | - | 0.50 | 0.50 | 0.50 | 0.50 | 0.40 | 0.40 | 0.40 |
| $S1/\Sigma Sce$ | 0.25 | 0.50 | 0.40 | 0.40 | 0.40 | 0.40 | 0.40 | 0.40 |
| $S2/\Sigma Sce$ | 0.25 | - | 0.60 | 0.60 | 0.60 | 0.60 | 0.60 | 0.60 |
| $S3/\Sigma Sce$ | 0.25 | - | - | - | - | - | - | - |
| $S4/\Sigma Sce$ | 0.25 | - | - | - | - | - | - | - |
| $\theta1°$ | 80 | 45 | 45 | 30 | 30 | 30 | 30 | 30 |
| $\theta2°$ | 50 | 45 | 45 | 15 | 15 | 15 | 15 | 15 |
| $\theta3°$ | 20 | - | - | - | - | - | - | - |
| $\theta4°$ | -10 | - | - | - | - | - | - | - |
| $Dp/TW$ | 0.03 | 0.05 | 0.05 | 0.05 | 0.05 | 0.05 | 0.04 | 0.04 |
| $D1/TW$ | 0.08 | 0.20 | 0.20 | 0.20 | 0.20 | 0.20 | 0.20 | 0.15 |
| $D2/TW$ | 0.13 | 0.35 | 0.35 | 0.35 | 0.35 | 0.35 | 0.35 | 0.30 |
| $D3/TW$ | 0.22 | - | - | - | - | - | - | - |
| $D4/TW$ | 0.30 | - | - | - | - | - | - | - |
| WET BRAKING PERFORMANCE | 100 | 103 | 104 | 106 | 107 | 108 | 108 | 110 |
| BRAKING ON SNOW PERFORMANCE | 100 | 101 | 102 | 103 | 104 | 104 | 105 | 106 |

FIG. 6

PNEUMATIC TIRE

TECHNICAL FIELD

The technology relates to a pneumatic tire and particularly relates to a pneumatic tire that can provide improved wet performance and snow performance.

BACKGROUND ART

In recent years, there has been a demand for high wet performance, in addition to snow performance, for winter tires. A technology described in Japan Unexamined Patent Publication No. 2015-081076 has been known as a pneumatic tire in the related art that addresses this problem.

SUMMARY

The technology provides a pneumatic tire that can provide improved wet performance and snow performance.

A pneumatic tire according to an embodiment of the technology includes: a plurality of first inclined main grooves that extend while inclining to one side with respect to a tire circumferential direction and open to a tire equatorial plane and a tire ground contact edge on the one side; a plurality of second inclined main grooves that extend while inclining to an other side with respect to the tire circumferential direction and open to the tire equatorial plane and a tire ground contact edge on the other side; a plurality of first land portions each defined by a pair of the first inclined main grooves adjacent to each other and by one of the second inclined main grooves, the plurality of first land portions extending from the tire equatorial plane to the tire ground contact edge on the one side; and a plurality of second land portions each defined by a pair of the second inclined main grooves adjacent to each other and by one of the first inclined main grooves, the plurality of second land portions extending from the tire equatorial plane to the tire ground contact edge on the other side. The plurality of first land portions are arrayed adjacent to each other in the tire circumferential direction, the plurality of second land portions are arrayed adjacent to each other in the tire circumferential direction, the first land portions and the second land portions are arrayed in a staggered manner along the tire equatorial plane, each of the first land portions and the second land portions includes a plurality of through grooves that extend through the land portion and open to the respective pair of first or second inclined main grooves and a plurality of blocks defined by the through grooves, the blocks include an innermost center block, which is defined as a block closest to the tire equatorial plane, and an edge portion of the innermost center block has a notch portion that opens to a connection portion of the first or second inclined main grooves.

In a pneumatic tire according to an embodiment of the technology, (1) the first inclined main grooves and the second inclined main grooves extend from the tire ground contact edge to the tire equatorial plane, and thus the edge components of a tread portion increase and the braking on snow performance of the tire improves, and the drainage properties of the tread portion improve and the wet braking performance of the tire improves. Additionally, (2) the land portions extending from the tire equatorial plane to the tire ground contact edge are arrayed adjacent to each other in the tire circumferential direction, and, compared to a configuration in which a third land portion is disposed between the land portions, the arrangement efficiency of the inclined main grooves and the land portions is made appropriate, and the drainage properties and the rigidity in a ground contact region of the tire are made appropriate. Moreover, (3) the first land portions and the second land portions are arrayed in the staggered manner along the tire equatorial plane while inverting the longitudinal direction therebetween, and the snow traction performance and the braking on snow performance of the tire improve. Further, (4) the edge portion of the innermost center block has the notch portion that opens to the connection portion of the inclined main grooves, and thus the drainage properties of a tread portion center region improve. These have the advantage of improving the snow performance and the wet performance of the tire.

BRIEF DESCRIPTION OF DRAWINGS

FIG. 6 is a table showing the results of performance tests of pneumatic tires according to embodiments of the technology.

DETAILED DESCRIPTION

Embodiments of the technology will be described in detail below with reference to the drawings. Note that embodiments of the technology are not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Pneumatic Tire

Figure 1:
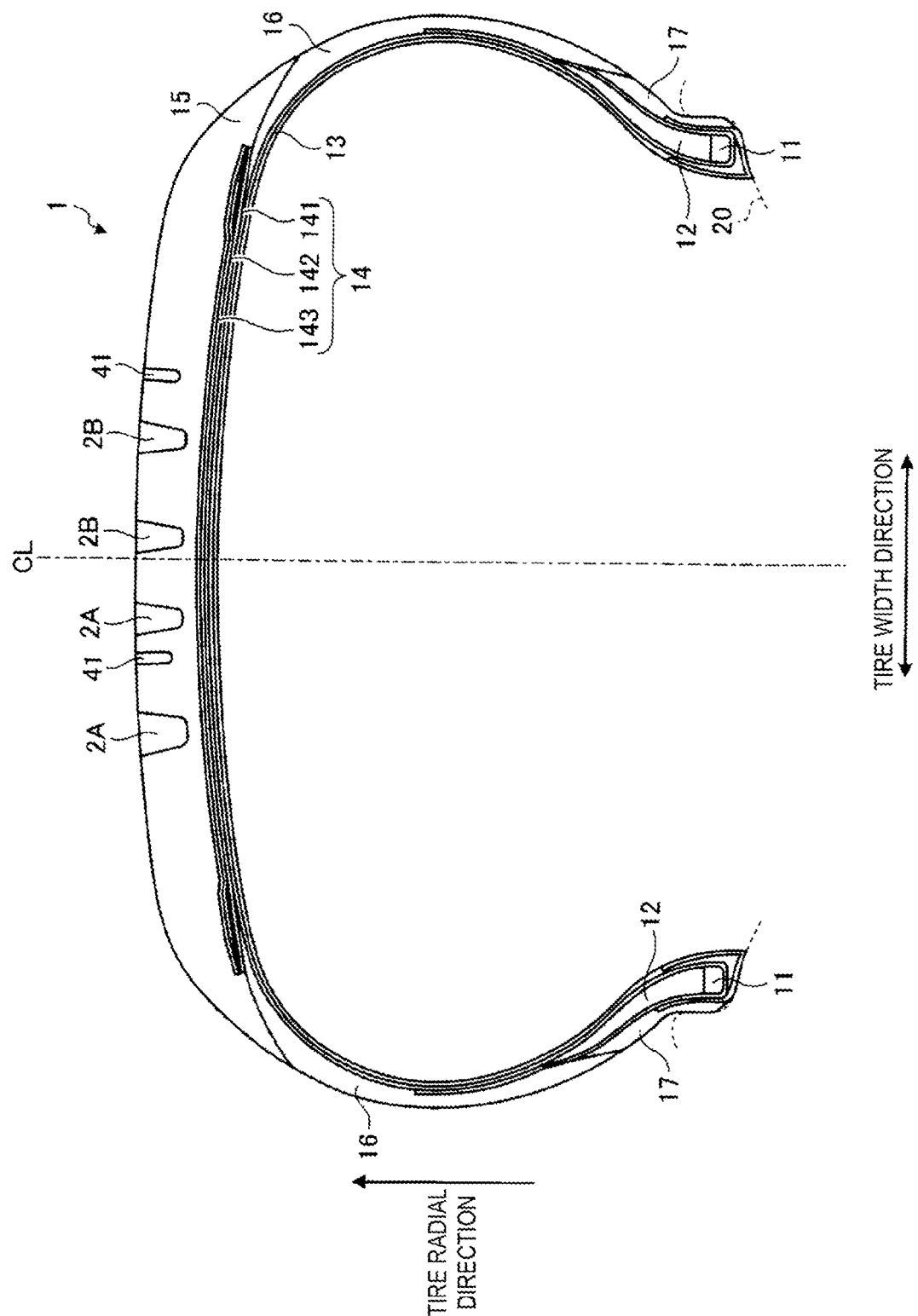
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction. The same drawing also illustrates a radial tire for a passenger vehicle as an example of a pneumatic tire.

In the same drawing, a cross-section in the tire meridian direction is defined as a cross-section of the tire taken along a plane that includes a tire rotation axis (not illustrated). Further, a tire equatorial plane CL is defined as a plane perpendicular to the tire rotation axis through a midpoint between measurement points in a tire cross-sectional width defined by JATMA (The Japan Automobile Tyre Manufacturers Association, Inc.). Additionally, a tire width direction is defined as a direction parallel to the tire rotation axis, and the tire radial direction is defined as a direction perpendicular to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each include one or more of bead wires made of steel and made by being wound annularly multiple times, and the pair of bead cores 11, 11 are embedded in bead portions and constitute cores of the bead portions of left and right. The pair of bead fillers 12, 12 are respectively disposed on an outer circumference of the pair of bead cores 11, 11 in the tire radial direction and reinforce the bead portions.

The carcass layer 13 includes a single layer structure made of one carcass ply, or a multilayer structure made of a plurality of carcass plies being layered, and the carcass layer 13 extends in a toroidal shape between the bead cores 11, 11 of left and right, and constitutes the backbone of the tire. Additionally, both end portions of the carcass layer 13 are wound and turned back toward an outer side in the tire width direction to wrap the bead cores 11 and the bead fillers 12, and are fixed. Moreover, the carcass ply of the carcass layer 13 is made by covering a plurality of carcass cords made of steel or an organic fiber material (for example, aramid, nylon, polyester, rayon, or the like) with coating rubber and performing a rolling process on the carcass cords, and has a cord angle (defined as an inclination angle in a longitudinal direction of the carcass cords with respect to a tire circumferential direction) of 80 degrees or more and 100 degrees or less.

The belt layer 14 is made of a plurality of belt plies 141 to 142 being layered, and is disposed around an outer circumference of the carcass layer 13. The belt plies 141 to 142 include a pair of cross belts 141, 142 and a belt cover 143.

The pair of cross belts 141, 142 are made by covering a plurality of belt cords made of steel or an organic fiber material with coating rubber and performing a rolling process on the belt cords, and each have a cord angle with an absolute value of 15 degrees or more and 55 degrees or less. Further, the pair of cross belts 141, 142 have cord angles (defined as inclination angles in a longitudinal direction of the belt cords with respect to the tire circumferential direction) of opposite signs relative to each other and are layered such that the longitudinal directions of the belt cords intersect each other (so-called crossply structure). Furthermore, the pair of cross belts 141, 142 are disposed layered on an outer side in the tire radial direction of the carcass layer 13.

The belt cover 143 is made by covering a belt cover cord made of steel or an organic fiber material with coating rubber and has a cord angle with an absolute value of 0 degrees or more and 10 degrees or less. Additionally, the belt cover 143 is, for example, a strip material made by covering one or a plurality of belt cover cords with coating rubber, and is formed by winding the strip material spirally multiple times on outer circumferential surfaces of the cross belts 141 and 142 in the tire circumferential direction.

The tread rubber 15 is disposed in the outer circumferences in the tire radial direction of the carcass layer 13 and the belt layer 14 and constitutes a tread portion of the tire. The pair of sidewall rubbers 16, 16 are disposed on an outer side in the tire width direction of the carcass layer 13 and constitute sidewall portions of left and right, respectively. The pair of rim cushion rubbers 17, 17 extend from an inner side in the tire radial direction of the bead cores 11, 11 of left and right and turned back portions of the carcass layer 13 toward the outer side in the tire width direction, and constitute rim fitting surfaces of the bead portions.

Tread Pattern

Figure 2:
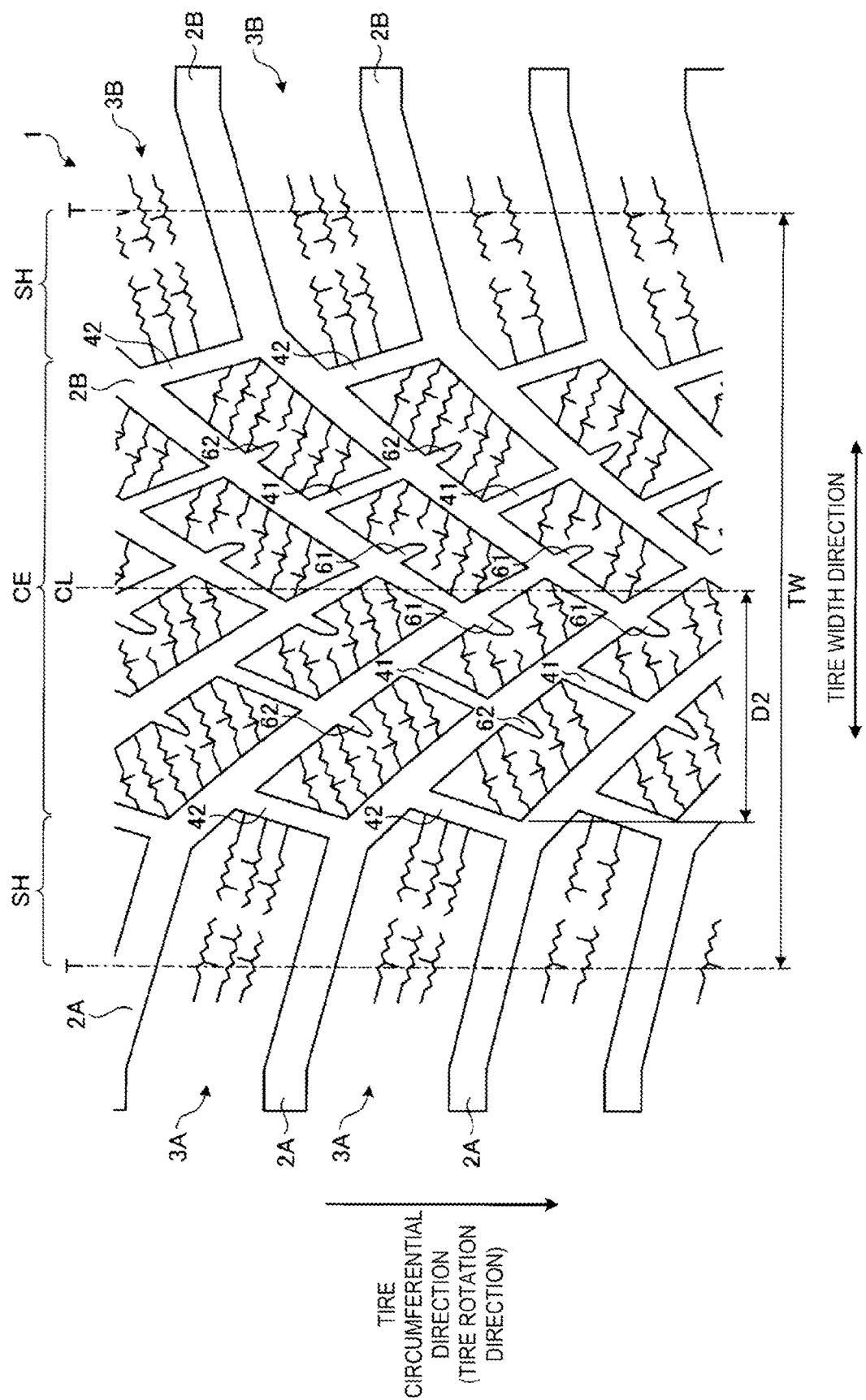
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread surface of a winter tire.

A tire rotation direction illustrated in FIG. 2 is defined as a rotation direction frequently used when the tire is in use and more specifically as a rotation direction when a vehicle advances. Furthermore, a ground contact leading side (so-called leading side or toe side) and a ground contact trailing side (so-called trailing side or heel side) of a block when the tire comes into contact with the ground are defined by the tire rotation direction. In addition, the pneumatic tire includes a rotation direction indicator portion (not illustrated) that indicates the tire rotation direction. The rotation direction indicator portion is formed, for example, of a mark or recesses/protrusions provided on the sidewall portion of the tire.

Further, a tire ground contact edge T is defined as a maximum width position in a tire axial direction of a contact surface between the tire and a flat plate when the tire is mounted on a specified rim, inflated to a specified internal pressure, placed vertically on the flat plate in a static state, and loaded with a load corresponding to a specified load.

Additionally, "specified rim" refers to an "applicable rim" defined by JATMA, a "Design Rim" defined by TRA (The Tire and Rim Association, Inc.), or a "Measuring Rim" defined by ETRTO (The European Tire and Rim Technical Organization). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a tire for a passenger vehicle, the specified internal pressure is an air pressure of 180 kPa, and the specified load is 88% of the maximum load capacity.

As illustrated in FIG. 2, the pneumatic tire 1 includes first and second inclined main grooves 2A, 2B and first and second land portions 3A, 3B, which are defined by the inclined main grooves 2A, 2B, respectively.

The first inclined main groove 2A extends while inclining to one side (left side in the drawings) with respect to the tire circumferential direction and opens to the tire equatorial plane CL and the tire ground contact edge T on the one side. Additionally, a plurality of the first inclined main grooves 2A are arrayed at predetermined intervals in the tire circumferential direction. The second inclined main groove 2B extends while inclining to the other side (right side in the drawings) with respect to the tire circumferential direction and opens to the tire equatorial plane CL and the tire ground contact edge T on the other side. Additionally, a plurality of the second inclined main grooves 2B are arrayed at predetermined intervals in the tire circumferential direction. Specifically, the first and second inclined main grooves 2A, 2B each incline from the tire equatorial plane CL toward the outer side in the tire width direction to an opposite side of the tire rotation direction (i.e., the ground contact trailing side). Moreover, the first and second inclined main grooves 2A, 2B each extend beyond the tire equatorial plane CL.

The first and second inclined main grooves 2A, 2B each are a groove on which a wear indicator must be provided as specified by JATMA and have a groove width of 2.5 mm or more and a groove depth of 6.5 mm or more (dimension symbols omitted in the drawings). In the configuration of FIG. 2, groove widths of the inclined main grooves 2A, 2B monotonically decrease from the tire ground contact edge T toward the tire equatorial plane CL, and are each smallest at an opening position with respect to another inclined main groove 2B or 2A, respectively. Additionally, the groove width of the inclined main groove 2A or 2B is smallest at a position where the inclined main groove 2A or 2B connects sideways with another inclined main groove 2B or 2A.

The groove width is measured as a distance between groove walls opposed to each other in a groove opening portion when the tire is mounted on a specified rim, inflated to a specified internal pressure, and in an unloaded state. In a configuration in which the groove opening portion includes a notch portion or a chamfered portion, the groove width is measured with intersection points between an extension line of the tread contact surface and extension lines of the groove walls as measurement points, in a cross-sectional view parallel with the groove width direction and the groove depth direction.

The groove depth is a distance from the tread contact surface to a maximum groove depth position and is measured when the tire is mounted on a specified rim, inflated to a specified internal pressure, and in an unloaded state. Additionally, in a configuration in which a groove bottom includes a partial recess/protrusion portion or a sipe, the groove depth is measured excluding the partial recess/protrusion portion or the sipe.

Also, one first inclined main groove 2A opens in a Y-shape to one second inclined main groove 2B, thus constituting one main groove unit (unit made of a pair of the inclined main grooves 2A, 2B; reference sign omitted in the drawings). Specifically, the first inclined main groove 2A connects sideways to the second inclined main groove 2B, and terminates without intersecting the second land portion 3B on an extension line of the groove center line. Additionally, the second inclined main groove 2B of the main groove unit opens in the Y-shape to the first inclined main groove 2A of another main groove unit adjacent in the tire rotation direction. Moreover, the second inclined main groove 2B connects sideways to the first land portion 3A, and terminates without intersecting the first land portion 3A on an extension line of the groove center line. Also, a plurality of the main groove units (2A, 2B) are repeatedly arrayed and connected in the tire circumferential direction. Accordingly, the first inclined main grooves 2A and the second inclined main grooves 2B are alternately connected in the Y-shape in the tire circumferential direction, forming a tread pattern in which a plurality of the inclined main grooves 2A, 2B are connected in the tire circumferential direction.

Note that reference signs 61, 62 in the drawings are notch portions of blocks and are distinguished from each other with respect to the inclined main grooves 2A, 2B, respectively. The notch portions 61, 62 will be described below.

In the configuration described above, the inclined main grooves 2A, 2B are connected to each other in the Y-shape and arrayed in the tire circumferential direction without passing through long land portions 3A, 3B extending from the tire equatorial plane CL to the tire ground contact edge T as described above. Accordingly, the arrangement efficiency of the inclined main grooves 2A, 2B and the long land portions 3A, 3B is made appropriate, and the drainage properties and the rigidity in the ground contact region of the tire are made appropriate.

For example, in the configuration of FIG. 2, the first and second inclined main grooves 2A, 2B have a linear symmetrical structure centered on the tire equatorial plane CL, and are arrayed in a staggered manner in the tire circumferential direction. Additionally, the first and second inclined main grooves 2A, 2B have an arc shape that is gently curved or an L shape that is gently bent. Also, inclination angles of the first and second inclined main grooves 2A, 2B (dimension symbols omitted in the drawings) monotonically increase from the tire equatorial plane CL toward the outer side in the tire width direction. Accordingly, the drainage properties of the ground contact region of the tire are enhanced.

The inclination angles of the inclined main grooves 2A, 2B are each defined as an angle formed by the tangent line with respect to a groove center line of the inclined main groove and an opposite direction of the tire rotation direction. The groove center line of the inclined main groove is defined as a smooth curve connecting midpoints of the groove walls of left and right of the inclined main groove.

The first land portion 3A is defined by a pair of the first inclined main grooves 2A, 2A adjacent in the tire circumferential direction and one second inclined main groove 2B, and has a long structure extending from the tire equatorial plane CL to the tire ground contact edge T on one side (left side in the drawings). Additionally, a plurality of the first land portions 3A, 3A are arrayed adjacent to each other in the tire circumferential direction. Similarly, the second land portion 3B is defined by a pair of the second inclined main grooves 2B, 2B adjacent to each other in the tire circumferential direction and one first inclined main groove 2A, and has a long structure extending from the tire equatorial plane CL to the tire ground contact edge T on the other side (right side in the drawings). Additionally, a plurality of the second land portions 3B are arrayed adjacent to each other in the tire circumferential direction. Also, the first land portions 3A and the second land portions 3B are arrayed in a staggered manner along the tire equatorial plane CL while inverting the longitudinal direction therebetween.

For example, in the configuration of FIG. 2, the first and second land portions 3A, 3B have a linear symmetrical structure centered on the tire equatorial plane CL, and are arrayed in the staggered manner in the tire circumferential direction. Additionally, the first and second land portions 3A, 3B have a long shape that is gently curved or bent. Additionally, longitudinal directions of the first and second land portions 3A, 3B each incline from the tire equatorial plane CL toward the outer side in the tire width direction to an opposite side (i.e., the ground contact trailing side) in the tire rotation direction. Also, widths (dimension symbols omitted in the drawings) of the first and second land portions 3A, 3B monotonically increase from the tire equatorial plane CL toward the outer side in the tire width direction. Accordingly, the grounding characteristics of the tire are enhanced.

The width of the land portion 3A is defined as a width in a direction perpendicular to the longitudinal direction of the land portion 3A, that is, an extension direction of the inclined main groove 2A that defines the land portion 3A. The width of the land portion 3B is defined as a width in a direction perpendicular to the longitudinal direction of the land portion 3B, that is, an extension direction of the inclined main groove 2B that defines the land portion 3B.

In the configuration described above, (1) the first inclined main groove 2A and the second inclined main groove 2B extend from the tire ground contact edge T to the tire equatorial plane CL, and thus the edge components of the tread portion improve and the braking on snow performance of the tire improves, and the drainage properties of the tread portion improve and the wet braking performance of the tire improves. Additionally, (2) the land portions 3A, 3B extend from the tire equatorial plane CL to the tire ground contact edge T and are arrayed adjacent to each other in the tire circumferential direction, and thus, compared to a configuration in which a third land portion is disposed between the land portions 3A, 3B (see, for example, FIG. 7), the arrangement efficiency of the inclined main grooves 2A, 2B and the land portions 3A, 3B is made appropriate, and the drainage properties and the rigidity in the ground contact region of the tire are made appropriate. Furthermore, (3) the first land portions 3A and the second land portions 3B are arrayed in a staggered manner along the tire equatorial plane CL while inversing the longitudinal direction therebetween, and thus the snow traction performance and the braking on snow performance of the tire improve. These improve the snow performance and the wet performance of the tire.

Figure 3:
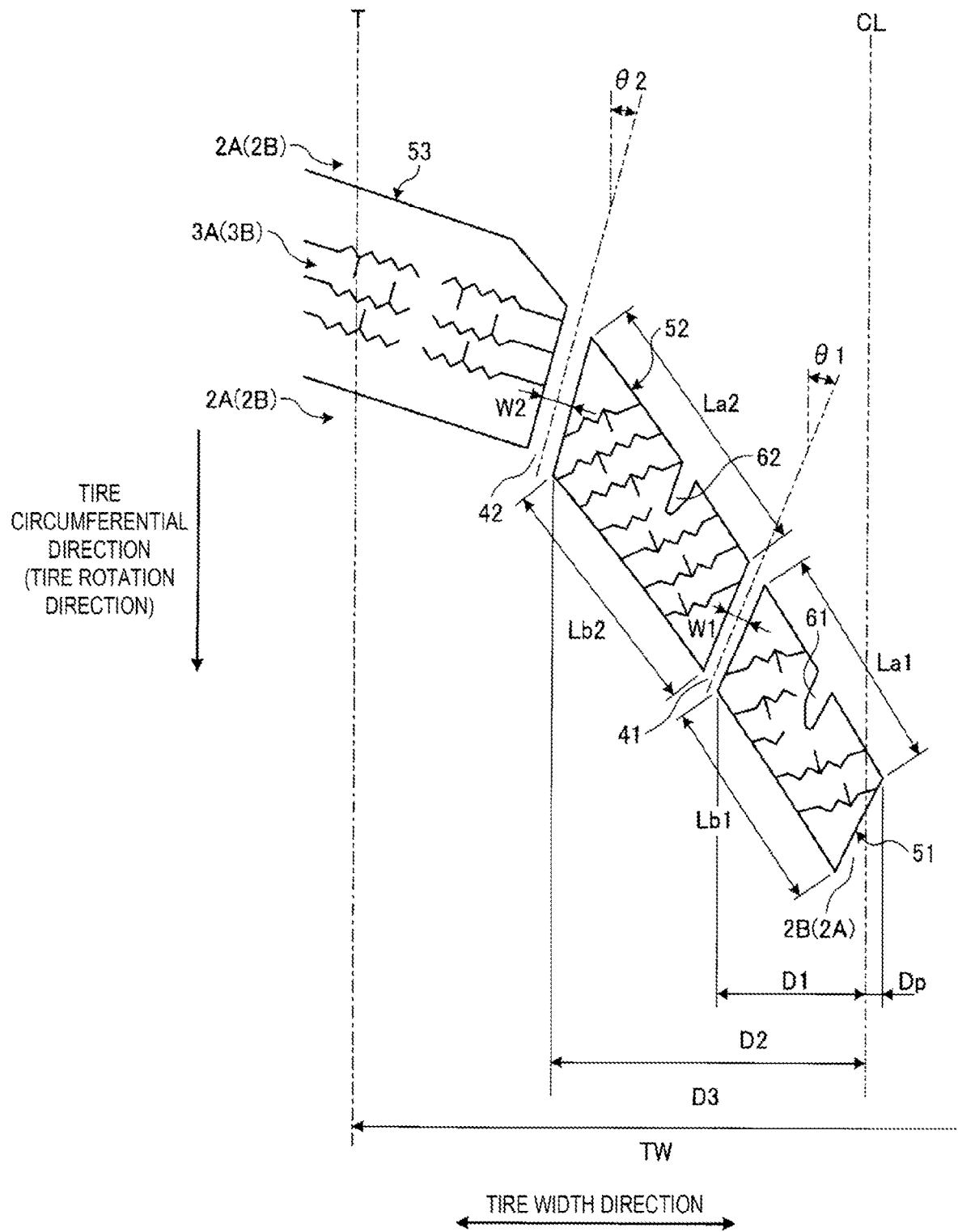
FIG. 3 is an explanatory diagram illustrating a land portion illustrated in FIG. 2.

FIG. 3 is an explanatory diagram illustrating the land portion described in FIG. 2. The same drawing illustrates an enlarged view of a single land portion 3A (3B) extracted.

As illustrated in FIG. 3, one land portion 3A (3B) includes a plurality of through grooves 41, 42 and a plurality of blocks 51 to 53 defined by the through grooves 41, 42. Preferably, the number of through grooves in the one land portion 3A (3B) is 2 or more and 4 or less and the number of blocks therein is 3 or more and 5 or less.

The through grooves 41, 42 have an open structure that extends through the land portion 3A (3B) and open to a pair of adjacent inclined main grooves 2A, 2A (2B, 2B). Additionally, the plurality of through grooves 41, 42 are disposed at predetermined intervals in the longitudinal direction of the land portion 3A (3B).

Moreover, the through grooves 41, 42 have groove widths W1, W2, respectively, of 1.5 mm or more and groove depths (not illustrated) of 3.0 mm or more, and open when the tire comes into contact with the ground to function as a groove. Additionally, the groove widths W1, W2 of the plurality of the through grooves 41, 42 have the relationship W1≤W2. Also, in a configuration provided with three or more through grooves (not illustrated), the groove widths of the through grooves monotonically increase from an innermost through groove 41 closest to the tire equatorial plane CL toward the outer side in the tire width direction. In the configuration of FIG. 2, the groove width W1 of the innermost through groove 41 is the smallest and is in the range 1.5 mm≤W1≤3.5 mm. Moreover, the groove width W2 of an outermost through groove 42 on an outermost side in the tire width direction is the largest and is in the range 3.5 mm≤W2≤6.0 mm.

Additionally, the through grooves 41, 42 have inclination angles θ1, θ2, respectively, of 10 degrees or greater and 90 degrees or less, and incline toward the tire rotation direction to the outer side in the tire width direction. Also, the inclination angles θ1, θ2 of the plurality of the through grooves 41, 42, respectively, have the relationship θ1≥θ2. Moreover, in a configuration provided with three or more through grooves (not illustrated), the inclination angles of the through grooves monotonically decrease from an innermost through groove 1 toward the outer side in the tire width direction. In the configuration of FIG. 2, the inclination angle θ1 of the innermost through groove 41 with respect to the tire circumferential direction is in the range 20°≤θ1≤40°.

Further, the inclination angle θ2 of the outermost through groove 42 is in the range 10°≤θ2≤30°.

The inclination angle θ1 of the through groove 41 is measured as an angle formed by an imaginary straight line connecting opening portions of left and right, with respect to the inclined main groove 2A, of the through groove 41 and by the opposite direction of the tire rotation direction. The inclination angle θ2 of the through groove 42 is measured as an angle formed by an imaginary straight line connecting opening portions of left and right, with respect to the inclined main groove 2B, of the through groove 42 and by the opposite direction of the tire rotation direction.

Additionally, in the configuration of FIG. 2, the plurality of the outermost through grooves 42 are arrayed in the tire circumferential direction, and the outermost through grooves 42 have the inclination angle θ2 described above, and thus the opening positions with respect to the inclined main groove 2A or 2B are mutually offset. Accordingly, circumferential grooves having a zigzag shape are formed by alternately connecting the outermost through grooves 42 and portions of the inclined main groove 2A or 2B in the tire circumferential direction.

The blocks 51 to 53 are defined by the plurality of the through grooves 41, 42, and are arrayed in a row along a pair of inclined main grooves 2A, 2A (2B, 2B) defining the land portions 3A (3B). In the configuration of FIG. 3, one land portion 3A (3B) includes three blocks 51 to 53. Additionally, the blocks 51 to 53 of a tread portion center region have a trapezoidal shape with edge portions on the sides of the pair of inclined main grooves 2A, 2A (2B, 2B) being substantially parallel opposite sides. Moreover, the blocks 51, 52 of the tread portion center region have acute corner portions on the leading side in the tire rotation direction and on the outer side in the tire width direction.

A tread portion center region CE (see FIG. 2) is defined as a region on an inner side in the tire width direction demarcated by the outermost through grooves 42 on an outermost side in the tire width direction. Additionally, a tread portion shoulder region SH is defined as a region on the outer side in the tire width direction demarcated by the outermost through grooves 42.

Further, an innermost center block 51 closest to the tire equatorial plane CL is disposed on the tire equatorial plane CL. Additionally, a projection amount Dp (see FIG. 3) of the innermost center block 51 with respect to the tire equatorial plane CL preferably has the relationship 0<Dp/TW≤0.15 with respect to a tire ground contact width TW, and more preferably has the relationship 0.01≤Dp/TW≤0.10. Also, the projection amount Dp of the innermost center block 51 is preferably in the range 0.5 mm≤Dp≤5.0 mm, and is more preferably in the range 1.0 mm≤Dp≤4.0 mm.

Also, in the center blocks 51, 52 in the tread portion center region, distances D1, D2 from the tire equatorial plane CL to corner portions of the center blocks 51, 52, respectively, on the outer side in the tire width direction have the relationship D1<D2. In a configuration provided with three or more center blocks (not illustrated), distances to corner portions of the center blocks increase from the innermost center block 51 closest to the tire equatorial plane CL toward the outer side in the tire width direction. The distance D1 of the corner portion of the innermost center block 51 has the relationship 0.10≤D1/TW≤0.20 with respect to the tire ground contact width TW. The distance D2 of the corner portion of the outermost center block 52 on the outermost side in the tire width direction has the relationship 0.22≤D2/TW≤0.35 with respect to the tire ground contact width TW.

Moreover, ground contact areas S1, S2 of the center blocks 51, 52, respectively, have the relationship S1≤S2. In a configuration provided with three or more center blocks (not illustrated), ground contact areas of the center blocks monotonically increase from the innermost center block 51 toward the outer side in the tire width direction. A ratio S2/S1 of the ground contact areas S1 and S2 of adjacent center blocks 51, 52 is preferably in the range of 1.01 or more and 1.50 or less, and more preferably in the range of 1.05 or more and 1.30 or less. A ratio S1/ΣSce of the ground contact area S1 of the innermost center block 51 to the sum ΣSce of the ground contact areas S1, S2 of the center blocks 51, 52, respectively, is in the range of 0.30 or more and 0.50 or less. A ratio S2/ΣSce of a ground contact area S3 of the outermost center block 52 to the sum ΣSce of the ground contact areas S1, S2 of the center blocks 51, 52 and is in the range of 0.50 or more and 0.70 or less. In the configuration of FIG. 3, a ground contact area of a shoulder block 53 in the tread portion shoulder region is larger than the ground contact area of the outermost center block 52.

In the configuration described above, the edge components of a block in a region close to the tire equatorial plane CL are relatively large, and the snow traction properties of the ground contact region of the tire improve. On the other hand, the rigidity of the land portions 3A, 3B in a region close to the tire ground contact edge T increases, and the wet braking performance of the ground contact region of the tire improves. Accordingly, the snow performance and the wet performance of the tire are provided in a compatible manner.

Also, of the edge portions of the center blocks 51, 52 on the sides of the inclined main grooves 2A, 2A or 2B, 2B, edge portions on the trailing side in the tire rotation direction have edge lengths La1, La2 that are longer than edge lengths Lb1, Lb2 of edge portions on the leading side therein (Lb1<La1, Lb2<La2). Ratios of the edge lengths, i.e. La1/Lb1 and La2/Lb2, are preferably in the range of 1.01 or more and 1.15 or less, and more preferably in the range of 1.03 or more and 1.10 or less. The edge lengths La1, La2 (and Lb1, Lb2) of the center block 51 have the relationship La1≤La2 (and Lb1≤Lb2). In a configuration provided with three or more center blocks (not illustrated), edge lengths of the center blocks monotonically increase from the innermost center block 51 toward the outer side in the tire width direction. Note that the edge lengths La1 and La2 are measured as linear distances of both end portions of the edge portions of the blocks 51, 52, respectively.

In the configuration described above, the edge components of the blocks are relatively large on the side of the tire equatorial plane CL and on the trailing side of the tire rotation direction, and the snow traction properties of the ground contact region of the tire improve. Additionally, the edge lengths of the center blocks monotonically increase from the innermost center block 51 toward the outer side in the tire width direction, and the drainage properties of the ground contact region of the tire improve. These improve provide the snow performance and the wet performance of the tire in a compatible manner.

Note that the blocks 51 to 53 each have a plurality of sipes (reference sign omitted in the drawings). "Sipe" refers to a cut formed in a tread contact surface and has a sipe width of less than 1.5 mm and a sipe depth of 2.0 mm or greater, so that the sipe closes when the tire comes into contact with the ground.

Figure 4:
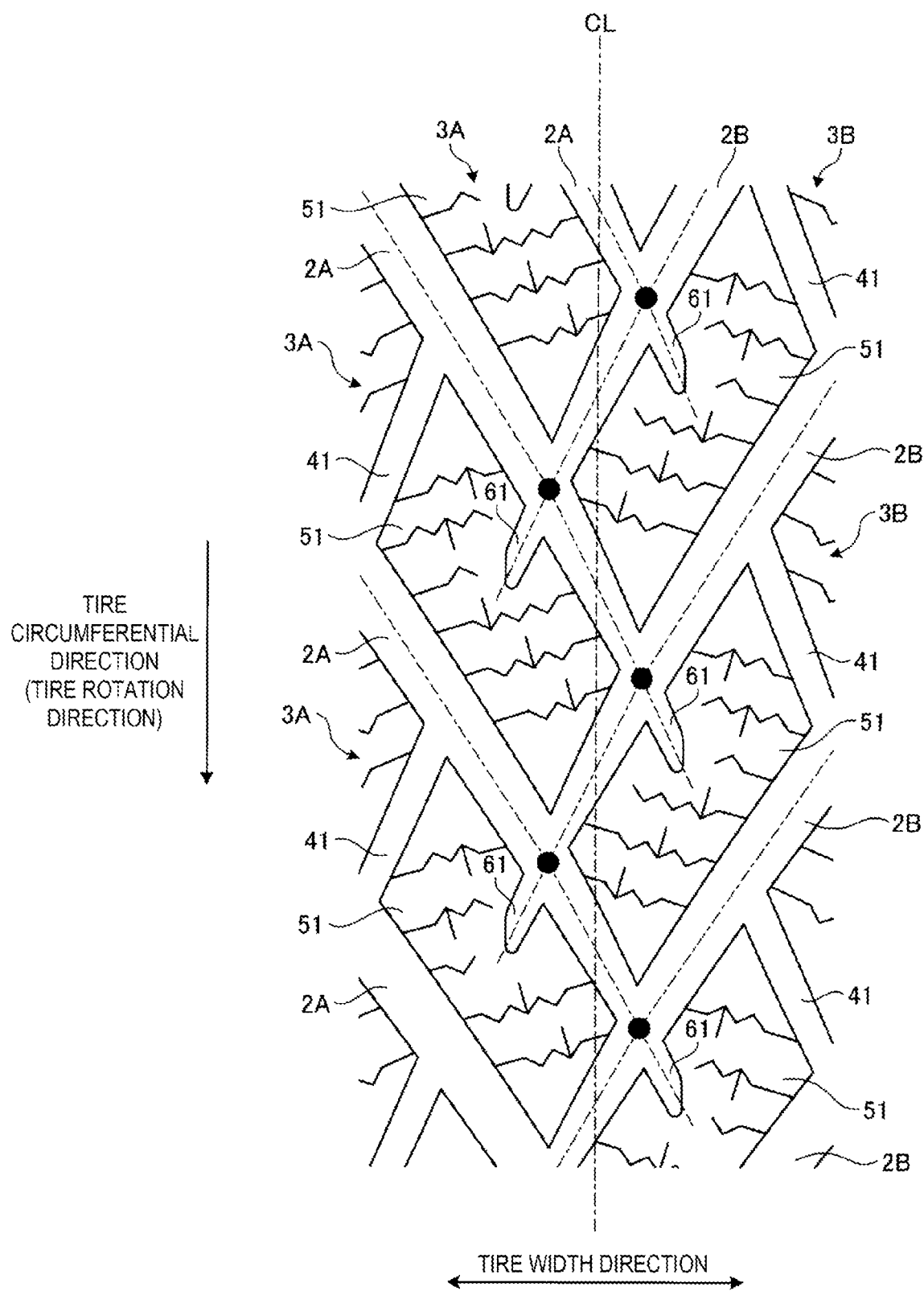
FIG. 4 is an enlarged view illustrating a main portion of the pneumatic tire illustrated in FIG. 2.
Figure 5:
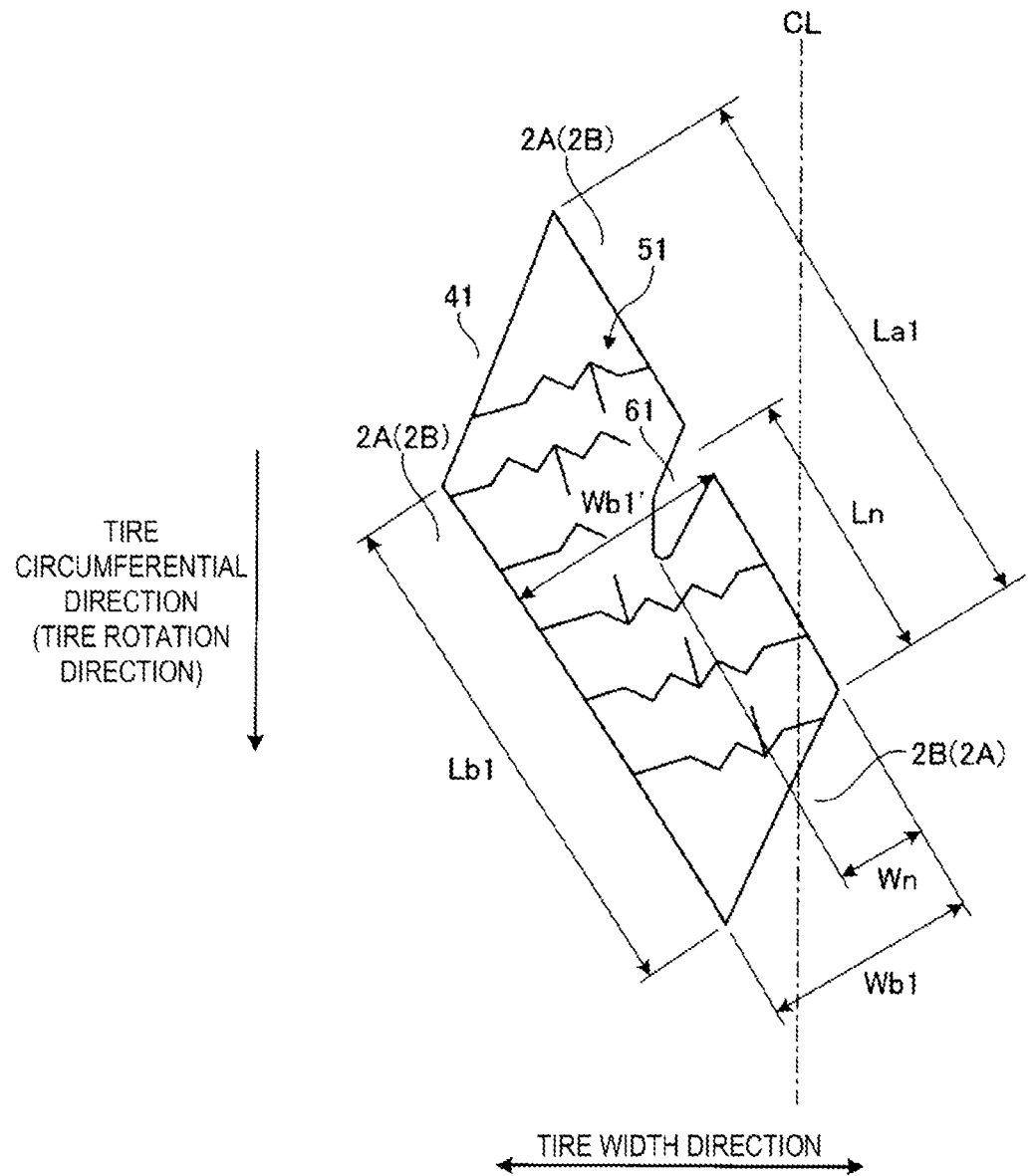
FIG. 5 is an enlarged view illustrating a main portion of the pneumatic tire illustrated in FIG. 2.

FIG. 4 and FIG. 5 are each an enlarged view illustrating a main portion of the pneumatic tire illustrated in FIG. 2. Of the drawings, FIG. 4 illustrates a configuration of the land portions 3A, 3B at or near the tire equatorial plane CL, and FIG. 5 illustrates a single block 51 closest to the tire equatorial plane CL.

In the configuration of FIG. 2, as described above, the first inclined main grooves 2A and the second inclined main grooves 2B extend beyond the tire equatorial plane CL, and the first inclined main grooves 2A and the second inclined main grooves 2B are alternately disposed in the tire circumferential direction and intersect each other in a Y-shape. Additionally, the first land portions 3A and the second land portions 3B are defined by the first inclined main grooves 2A and the second inclined main grooves 2B and are arrayed in a staggered manner along the tire equatorial plane CL.

In this configuration, as illustrated in FIG. 4, intersection points (reference sign omitted in the drawings) of groove center lines of the first inclined main grooves 2A and the second inclined main grooves 2B are arrayed in the staggered manner in the tire circumferential direction with the tire equatorial plane CL interposed therebetween. Accordingly, zigzagged main grooves made of portions of the first inclined main grooves 2A and the second inclined main grooves 2B are formed on the tire equatorial plane CL. Additionally, the innermost center blocks 51 of the first land portions 3A and the second land portions 3B have a road contact surface on the tire equatorial plane CL, and the innermost center blocks 51 of the first land portions 3A and the innermost center blocks 51 of the second land portions 3B are arrayed in the staggered manner in the tire circumferential direction with the tire equatorial plane CL interposed therebetween.

In addition, in FIG. 5, an aspect ratio Wb1/Lb1 of the innermost center block 51 is preferably in the range 1.50≤Wb1/Lb1≤3.00, and more preferably in the range 1.80≤Wb1/Lb1≤2.50. A dimension Lb1 is a maximum length of the block 51 in an extension direction of the inclined main groove 2A or 2B, and a dimension Wb1 is a maximum width of the block 51 in a direction orthogonal to the extension direction of the inclined main groove 2A or 2B. Notch portion in the blocks As illustrated in FIG. 2, the center blocks 51, 52 each include a first notch portion 61 or a second notch portion 62.

The first notch portion 61 is formed in the edge portion of the innermost center block 51 on the side of the inclined main groove 2A or 2B and opens to a connection portion of the inclined main grooves 2A, 2B of left and right. Specifically, the first notch portion 61 opens to a position where an inclined main groove 2A or 2B on one side connects sideways in the Y-shape to an inclined main groove 2B or 2A on the other side, and is disposed on an extension line of a groove center line of the inclined main groove 2A or 2B on the one side (see FIG. 4). The first notch portion 61 is formed in the edge portion of the innermost center block 51 on the trailing side in the tire rotation direction. On the other hand, the edge portion of the innermost center block 51 on the leading side in the tire rotation direction does not have a notch portion.

The notch portion is defined as a step-shaped recess portion (that is, a step portion) having a bottom surface parallel to the road contact surface of the land portion. Additionally, a short lug groove may be formed instead of the notch portion.

The second notch portion 62 is formed in the edge portion of another center block 52 on the side of the inclined main groove 2A or 2B and opens to a connection portion of the inclined main groove 2A or 2B and a communication groove 41. Specifically, the second notch portion 62 is disposed at a position facing an opening portion, with respect to the inclined main groove 2A or 2B, of the communication groove 41. Additionally, the second notch portion 62 is formed in the edge portion of the center block 52 on the trailing side in the tire rotation direction. On the other hand, the edge portion on the leading side of the center block 52 in the tire rotation direction does not have a notch portion.

Additionally, opening widths (dimension symbols omitted in the drawings) of the first and second notch portions 61, 62 are preferably in the range of 1.5 mm or more and 3.0 mm or less, and are preferably equal to or less than opposing opening widths of the inclined main grooves 2A, 2B or of the communication groove 41. Preferably, maximum depths (not illustrated) of the first and second notch portions 61, 62 are in the range of 2.0 mm or more and 7.0 mm or less and are in the range of 20% or more and 90% or less with respect to groove depths of the inclined main grooves 2A, 2B.

In the configuration described above, the connection portion of the inclined main grooves 2A, 2B is widened by the first notch portion 61, and the drainage properties of the tread portion center region improve. Furthermore, snow traction properties improve due to the edge components of the first notch portion 61. Accordingly, the wet performance and the snow performance of the tire improve.

Moreover, in FIG. 5, a distance Ln from a corner portion of the innermost center block 51 to an opening position of the first notch portion 61 preferably has the relationship $0.40 \leq Ln/La1 \leq 0.60$ with respect to the edge length La1 of the edge portion of the innermost center block 51, and more preferably have the relationship $0.45 \leq Ln/La1 \leq 0.55$. That is, the first notch portion 61 is disposed in a center portion of the edge portion of the innermost center block 51. Also, as described above, the first notch portion 61 opens to the connection portion of the inclined main grooves 2A, 2B of left and right, and the connection portion of the inclined main grooves 2A, 2B of left and right is located in the center portion of the edge portion of the innermost center block 51 (see FIG. 4). Also, as illustrated in FIG. 2, the second notch portion 62 is also disposed in a center portion of the edge portion of the center block 52 as is the case with the first notch portion 61.

The distance Ln of the first notch portion 61 is measured as a distance from a measurement point of the edge length La1 of the block 51 to the center of the opening portion of the first notch portion 61.

Additionally, in FIG. 5, an extension length Wn of the first notch portion 61 preferably has the relationship $0.30 \leq Wn/Wb1' \leq 0.50$ with respect to a width Wb1' of the innermost center block 51 at a position where the first notch portion 61 is disposed, and more preferably have the relationship $0.35 \leq Wn/Wb1' \leq 0.45$. Thus, the first notch portion 61 has a short structure compared to the through grooves 41, 42 extending through the land portions 3A, 3B. This ensures the rigidity of the block 51. Also, as illustrated in FIG. 2, the second notch portion 62 also has a short structure having dimensions similar to those of the first notch portion 61.

The extension length Wn of the first notch portion 61 is measured as an extension distance of the first notch portion 61 in the direction of the width Wb1 of the innermost center block 51.

Effect

As described above, the pneumatic tire 1 includes: the plurality of the first inclined main grooves 2A that extend while inclining to one side in the tire circumferential direction and open to the tire equatorial plane CL and to the tire ground contact edge T on the one side; the plurality of the second inclined main grooves 2B that extend while inclining to an other side in the tire circumferential direction and open to the tire equatorial plane CL and to the tire ground contact edge T on the other side; the plurality of the first land portions 3A that are defined by a pair of the first inclined main grooves 2A, 2A adjacent to each other and one second inclined main groove 2B, the plurality of the first land portions 3A extending from the tire equatorial plane CL to the tire ground contact edge T on one side; and the plurality of the second land portions 3B that are defined by a pair of the second inclined main grooves 2B, 2B adjacent to each other and one first inclined main groove 2A, the plurality of the second land portions 3B extending from the tire equatorial plane CL to the tire ground contact edge T on the other side (see FIG. 2). Additionally, the plurality of the first land portions 3A are arrayed adjacent to each other in the tire circumferential direction, and the plurality of the second land portions 3B are arrayed adjacent to each other in the tire circumferential direction. Moreover, the first land portions 3A and the second land portions 3B are arrayed in a staggered manner along the tire equatorial plane CL. Further, the first land portions 3A and the second land portions 3B each include the plurality of the through grooves 41, 42 extending through the land portions 3A, 3B and opening to the pair of the inclined main grooves, and the plurality of blocks 51 to 53 (see FIG. 3) defined by the through grooves 41, 42. The blocks 51 to 53 includes the innermost center block 51, which is defined as a block closest to the tire equatorial plane CL. Also, the edge portion of the innermost center block 51 has a notch portion 61 that opens to the connection portion of the inclined main grooves 2A, 2B (see FIG. 4).

In such a configuration, (1) the first inclined main groove 2A and the second inclined main groove 2B extend from the tire ground contact edge T to the tire equatorial plane CL, and thus the edge components of the tread portion increase and the braking on snow performance of the tire improves, and the drainage properties of the tread portion improve and the wet braking performance of the tire improves. Additionally, (2) the land portions 3A, 3B extend from the tire equatorial plane CL to the tire ground contact edge T and are arrayed adjacent to each other in the tire circumferential direction, and thus, compared to a configuration in which a third land portion is disposed between the land portions 3A, 3B (see, for example, FIG. 7), the arrangement efficiency of the inclined main grooves 2A, 2B and the land portions 3A, 3B is made appropriate, and the drainage properties and the rigidity in the ground contact region of the tire are made appropriate. Moreover, (3) the first land portions 3A and the second land portions 3B are arrayed in the staggered manner along the tire equatorial plane CL while inversing the longitudinal direction therebetween, and thus the snow traction performance and the braking on snow performance of the tire improve. Furthermore, (4) the edge portion of the innermost center block 51 has the notch portion 61 that opens to the connection portion of the inclined main grooves 2A, 2B, and thus the drainage properties of the tread portion center region improve. These have the advantage of improving the snow performance and the wet performance of the tire.

In the pneumatic tire 1, the distance Ln from the corner portion of the innermost center block 51 to the opening position of the notch portion 61 has the relationship $0.40 \leq Ln/La1 \leq 0.60$ with respect to the edge length La1 of the edge portion of the innermost center block 51 (see FIG. 5). In such a configuration, the notch portion 61 is disposed in the center portion, in the longitudinal direction, of the innermost center block 51, and this has the advantage that block rigidity is properly ensured.

Additionally, in the pneumatic tire 1, the extension length Wn of the notch portion 61 has the relationship $0.30 \leq Wn/Wb1' \leq 0.50$ with respect to the width Wb1' of the innermost center block 51 at the position where the notch portion 61 is disposed (see FIG. 5). In such a configuration, there is an advantage that block rigidity is properly ensured due to the notch portion 61 having a short structure.

Additionally, in the pneumatic tire 1, the first land portions 3A and the second land portions 3B each include two or more and four or less through grooves 41, 42, and three or more and five or less blocks 51 to 53 (see FIG. 3). This has the advantage that the number of through grooves 41, 42 and blocks 51 to 53 is made appropriate and the drainage properties and the rigidity in the ground contact region of the tire are made appropriate.

Additionally, in the pneumatic tire 1, one first inclined main groove 2A opens in the Y-shape with respect to one second inclined main groove 2B to form one main groove unit (see FIG. 2). The second inclined main groove 2B of the main groove unit opens in the Y-shape with respect to the first inclined main groove 2A of another main groove unit adjacent in the tire rotation direction. The plurality of the main groove units are arrayed in the tire circumferential direction. In such a configuration, the inclined main grooves 2A, 2B are connected to each other without extending through the land portions 3A, 3B that extend from the tire equatorial plane CL to the tire ground contact edge T. This has the advantage that the arrangement efficiency of the inclined main grooves 2A, 2B and the land portions 3A, 3B is made appropriate, and the drainage properties and the rigidity of the ground contact region of the tire are made appropriate.

Moreover, in the pneumatic tire 1, the groove widths of the through grooves 41, 42 monotonically increase ($W1 \leq W2$) from the through grooves 41 closest to the tire equatorial plane CL toward the outer side in the tire width direction (see FIG. 3). This has the advantage of providing the drainage properties and the rigidity of the ground contact region of the tire in a compatible manner.

Further, in the pneumatic tire 1, the inclination angles $\theta 1$, $\theta 2$ of the through grooves 41, 42, respectively, with respect to the tire circumferential direction monotonically decrease ($\theta 1 \geq \theta 2$) from the inclination angle of the through groove 41 closest to the tire equatorial plane CL toward the outer side in the tire width direction. (FIG. 3). This has the advantage of providing the drainage properties and the snow traction properties of the ground contact region of the tire in a compatible manner.

Also, in the pneumatic tire 1, the through grooves 41, 42 include the innermost through groove 41 closest to the tire equatorial plane CL, and the inclination angle $\theta 1$, with respect to the tire circumferential direction, of the innermost through groove 41 is in the range of 20 degrees or more and 40 degrees or less. This has the advantage of improving the snow traction properties of the tread portion center region.

Additionally, in the pneumatic tire 1, a ratio $S1/(S1+S2)$ of the ground contact area S1 of the innermost center block 51 to the sum of the ground contact areas S1 and S2 of the center blocks 51, 52 is in the range of 0.30-0.20 or more and 0.50-0.30 or less. This has the advantage that the ground contact area S1 of the innermost center block 51 is properly secured.

Moreover, in the pneumatic tire 1, of the blocks 51 to 53, the center blocks 51, 52 in the tread portion center region have ground contact areas S1, S2 (dimension symbols omitted in the drawings) that monotonically increase ($S1 \leq S2$) from the innermost center block 51 closest to the tire equatorial plane CL toward the outer side in the tire width direction (see FIG. 3). In such a configuration, the edge components of a block in a region close to the tire equatorial plane CL are relatively large, and the snow traction properties of the ground contact region of the tire improve. On the other hand, the rigidity of the land portions 3A, 3B in a region close to the tire ground contact edge T increases, and the wet braking performance of the ground contact region of the tire improves. This has the advantage of providing the snow performance and the wet performance of the tire in a compatible manner.

Also, in the pneumatic tire 1, a ground contact area ratio S2/S1 of adjacent center blocks 51, 52 is in the range of 1.01 or more and 1.50 or less. This has the advantage that the ground contact area ratio of the center blocks 51, 52 is made appropriate.

Moreover, the pneumatic tire 1 includes an indicator portion (not illustrated) indicating the tire rotation direction. Also, of the edge portions of the center blocks 51, 52 on the sides of the inclined main grooves 2A, 2A or 2B, 2B, the edge portions on the trailing side in the tire rotation direction have the edge lengths La1, La2 that are longer than the edge lengths Lb1, Lb2 of the edge portions on the leading side therein (Lb1<La1, Lb2<La2). This has the advantage of improving the traction characteristics of the center blocks 51, 52, improving the snow performance of the tire.

Additionally, in the pneumatic tire 1, a projection amount Dp of the innermost center block 51 with respect to the tire equatorial plane CL has the relationship $0<Dp/TW \leq 0.15$ with respect to the tire ground contact width TW. This has the advantage of making the rigidity balance of the innermost center block 51 appropriate, providing the snow performance and the wet performance of the tire in a compatible manner.

Moreover, in the pneumatic tire 1, the distance D1 (see FIG. 3) from the end portion of the innermost center block 51 on the outer side in the tire width direction to the tire equatorial plane CL has the relationship $0.10 \leq D1/TW \leq 0.20$ with respect to the tire ground contact width TW (see FIG. 2). This has the advantage of making the rigidity balance of the innermost center block 51 appropriate, providing the snow performance and the wet performance of the tire in a compatible manner.

Also, in the pneumatic tire 1, the outermost center block 52 is defined as a block on an outermost side in the tire width direction of the blocks 51, 52 in the tread portion center region. Further, the distance D2 from the end portion of the outermost center block 52 on the outer side in the tire width direction to the tire equatorial plane CL has the relationship $0.22 \leq D2/TW \leq 0.35$ with respect to the tire ground contact width TW. This has the advantage of making the rigidity balance of the outermost center block 52 appropriate, providing the snow performance and the wet performance of the tire in a compatible manner.

EXAMPLES

Figure 7:
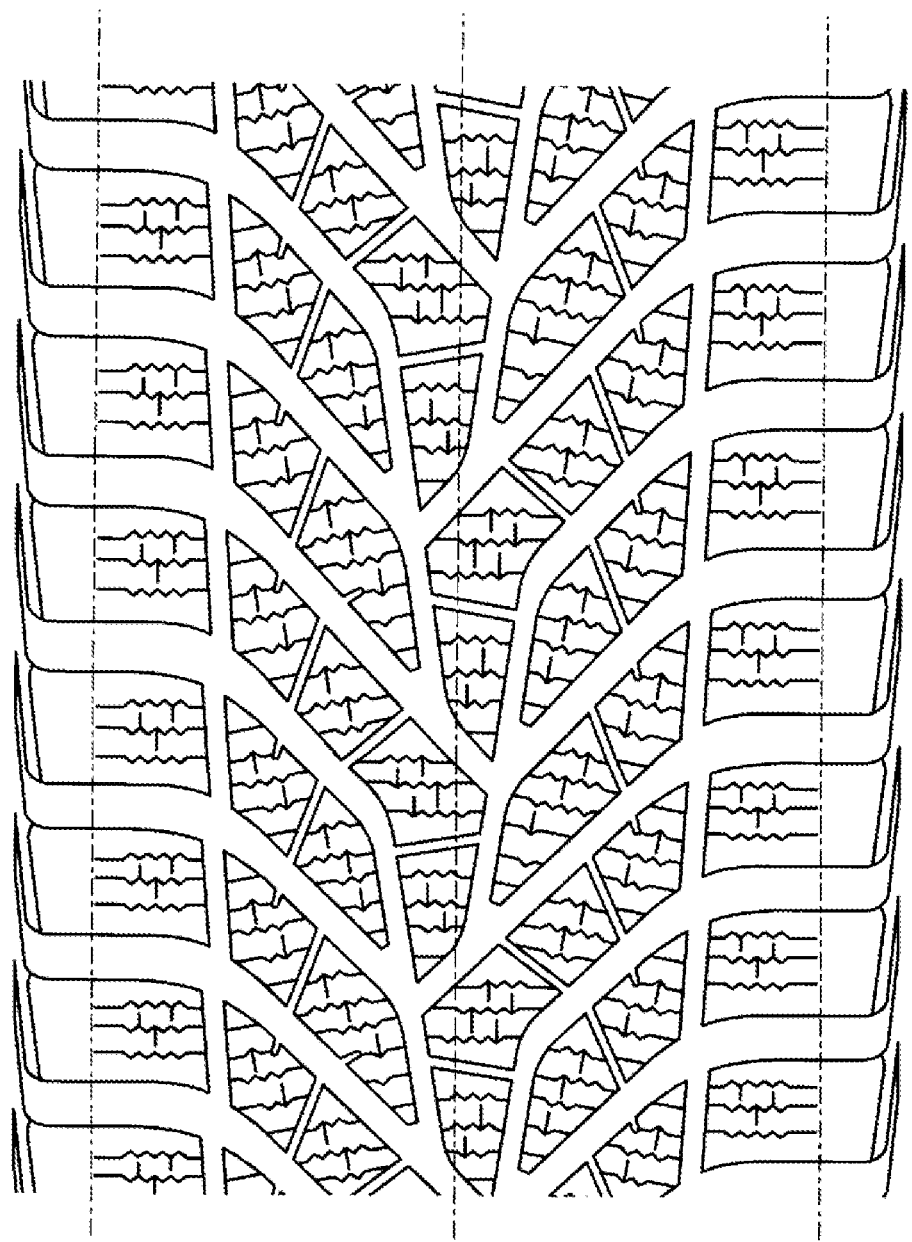
FIG. 7 is a plan view illustrating a tread portion of a pneumatic tire of Conventional Example.

FIG. 6 is a table indicating the results of performance tests of pneumatic tires according to embodiments of the technology. FIG. 7 is a plan view illustrating a tread portion of a pneumatic tire of Conventional Example.

In the performance tests, (1) wet braking performance and (2) braking on snow performance were evaluated for a plurality of types of test tires. Also, test tires having a tire size of 205/55R16 91H were assembled on a rim having a rim size of 16×6.5J, and an internal pressure of 200 kPa and a load specified by JATMA were applied to the test tires. Further, the test tires were mounted on a test vehicle, a front-engine front-drive (FF) passenger vehicle with an engine displacement of 1500 cc.

(1) In the evaluation relating to braking on snow performance, the test vehicle was driven on a snowy road surface of a snowy road test site and the braking distance at a traveling speed of 40 km/h was measured. The measurement results are expressed as index values and evaluated with Conventional Example being assigned as the reference (100). In this evaluation, larger values are preferable.

(2) In the evaluation relating to wet braking performance, the test vehicle was driven on an asphalt road covered with 1 mm of water and the braking distance at a traveling speed of 85 km/h was measured. The measurement results are expressed as index values and evaluated with Conventional Example being assigned as the reference (100). In this evaluation, larger values are preferable.

The test tires of Examples are provided with the configurations of FIG. 1 and FIG. 2, and long land portions 3A, 3B extending from the tire equatorial plane CL to the tire ground contact edge T are disposed adjacent to each other in the tire circumferential direction, and are arrayed in a staggered manner along the tire equatorial plane CL. Moreover, the inclined main grooves 2A, 2B have a groove width of 5.0 mm and a groove depth of 8.5 mm. Additionally, the through groove 41 on the side of the tire equatorial plane CL has a groove width of 3.0 mm and a groove depth of 4.5 mm, and the through groove 42 on the outer side in the tire width direction has a groove width of 5.0 mm and a groove depth of 4.5 mm. Further, the tire ground contact width TW is 160 mm. Still further, the notch portions 61, 62 have an opening width of 2.5 mm and a maximum depth of 4.5 mm.

The test tire of Conventional Example has the configuration of FIG. 7, and differs from the test tires of Examples, in particular, in that short land portions that do not extend to the tire equatorial plane CL are inserted between adjacent long land portions, and in that the land portions include four communication grooves (having inclination angles of θ1 to θ4) and four center blocks (having ground contact areas S1 to S4).

As can be seen from the test results, braking on snow performance and wet braking performance of the tire improve in the test tires of Examples, compared to the test tire of Conventional Example.

The invention claimed is:

1. A pneumatic tire, comprising:
a plurality of first inclined main grooves that extend while inclining to one side with respect to a tire circumferential direction and open to a tire equatorial plane and a tire ground contact edge on the one side;
a plurality of second inclined main grooves that extend while inclining to an other side in the tire circumferential direction and open to the tire equatorial plane and a tire ground contact edge on the other side;
a plurality of first land portions that are defined by a pair of the first inclined main grooves adjacent to each other and by one of the second inclined main grooves, the plurality of first land portions extending from the tire equatorial plane to the tire ground contact edge on the one side; and
a plurality of second land portions that are defined by a pair of the second inclined main grooves adjacent to each other and by one of the first inclined main grooves, the plurality of second land portions extending from the tire equatorial plane to the tire ground contact edge on the other side, the plurality of first land portions being arrayed adjacent to each other in the tire circumferential direction, the plurality of second land portions being arrayed adjacent to each other in the tire circumferential direction, the first land portions and the second land portions being arrayed in a staggered manner along the tire equatorial plane, the first land portions and the second land portions each comprising a plurality of through grooves that extend therethrough and open to the pair of the first inclined main grooves or the pair of the second inclined main grooves respectively, and a plurality of blocks defined by the through grooves, the plurality of through grooves having a straight shape and an inclination of all of the through grooves in each of the first land portions or the second land portions on a same side of the tire equatorial plane inclining toward a same direction with respect to the tire circumferential direction, the blocks in each of the first land portions and the second land portions comprising center blocks, including an innermost center block that is defined as a block closest to the tire equatorial plane and an outer center block that is defined outward in a tire width direction of the innermost center block, and a shoulder block defined as a block closest to the tire ground contact edge, the innermost center blocks comprising an edge portion that comprises a first notch portion opening to a connection portion of one of the first inclined main grooves or one of the second inclined main grooves, in each of the first land portions and the second land portions, a ratio of a ground contact area of the innermost center block to a sum of ground contact areas of center blocks being in a range of 0.30 or more and 0.50 or less, wherein the first notch portion in the innermost center block of the second land portions forms a terminating end of the first inclined main grooves, and the first notch portion in the innermost center block of the first land portions forms a terminating end of the second inclined main grooves, the outer center block in each of the first land portions and the second land portions comprising an edge portion that comprises a second notch portion opening to a connection portion of one of the through grooves in each of the first land portions and the second land portions with one of the first inclined main grooves or with one of the second inclined main grooves, an extension length Wn of the first notch portion of all of the innermost center blocks having a relationship $0.30 \leq Wn/Wb1' \leq 0.50$ with respect to a width $Wb1'$ of the innermost center block at a position where the first notch portion is disposed, and an extension length Wn of the second notch portion of all of the outer center blocks having a relationship $0.30 \leq Wn/Wb1' \leq 0.50$ with respect to a width $Wb1'$ of the outer center block at a position where the second notch portion is disposed, the extension length Wn of the first and second notch portions being measured as an extension distance of the first and second notch portions in a direction of the width $Wb1'$ of the innermost and outer center blocks, and the width $Wb1'$ of the innermost and outer center blocks being defined as a maximum width of the innermost and outer center blocks in a direction orthogonal to an extension direction of the first and second inclined main grooves.

2. The pneumatic tire according to claim 1, wherein in each of the first land portions and the second land portions, a distance Ln from a corner portion of the innermost center block to an opening position of the first notch portion has a relationship $0.40 \leq Ln/La1 \leq 0.60$ with respect to an edge length La1 of the edge portion of the innermost center block.

3. The pneumatic tire according to claim 1, wherein the first land portions and the second land portions each comprise two or more and four or less of the through grooves and three or more and five or less of the blocks.

4. The pneumatic tire according to claim 1, wherein one of the first inclined main grooves opens in a Y-shape with respect to one of the second inclined main grooves, the one of the first inclined main grooves and the one of the second inclined main grooves forming a main groove unit,
the second inclined main groove of the main groove unit opens in the Y-shape with respect to a first inclined main groove of another main groove unit adjacent in a tire rotation direction, and a plurality of the main groove units are arrayed in the tire circumferential direction.

5. The pneumatic tire according to claim 1, wherein, in each of the first land portions and the second land portions, groove widths of the through grooves monotonically increase from the through groove closest to the tire equatorial plane toward an outer side in a tire width direction.

6. The pneumatic tire according to claim 1, wherein, in each of the first land portions and the second land portions, inclination angles of the through grooves with respect to the tire circumferential direction monotonically decrease from an inclination angle of the through groove closest to the tire equatorial plane toward an outer side in a tire width direction.

7. The pneumatic tire according to claim 1, wherein, in each of the first land portions and the second land portions, the through grooves comprise an innermost through groove closest to the tire equatorial plane, and an inclination angle of the innermost through groove with respect to the tire circumferential direction is in a range of 20 degrees or more and 40 degrees or less.

8. The pneumatic tire according to claim 1, wherein, in each of the first land portions and the second land portions, ground contact areas of center blocks monotonically increase from the ground contact area of the innermost center block toward an outer side in a tire width direction.

9. The pneumatic tire according to claim 1, wherein, in each of the first land portions and the second land portions, a ratio of ground contact areas of center blocks adjacent to each other is in a range of 1.01 or more and 1.50 or less.

10. The pneumatic tire according to claim 1, wherein a display unit that designates a tire rotation direction is provided, and of edge portions on the sides of the inclined main grooves of the innermost center blocks, an edge portion on a trailing side in the tire rotation direction has an edge length that is longer than an edge length of an edge portion on a leading side.

11. The pneumatic tire according to claim 1, wherein, in each of the first land portions and the second land portions, a projection amount Dp of the innermost center block with respect to the tire equatorial plane has a relationship $0 < Dp/TW \leq 0.15$ with respect to a tire ground contact width TW.

12. The pneumatic tire according to claim 1, wherein, in each of the first land portions and the second land portions, a distance D1 from an end portion of the innermost center block on an outer side in a tire width direction to the tire equatorial plane has a relationship $0.10 \leq D1/TW \leq 0.20$ with respect to a tire ground contact width TW.

13. The pneumatic tire according to claim 1, wherein, in each of the first land portions and the second land portions, a distance D2 from an end portion of the outermost center block on the outer side in the tire width direction to the tire equatorial plane has a relationship $0.22 \leq D2/TW \leq 0.35$ with respect to a tire ground contact width TW.

14. A pneumatic tire, comprising:
a plurality of first inclined main grooves that extend while inclining to one side with respect to a tire circumferential direction and open to a tire equatorial plane and a tire ground contact edge on the one side;
a plurality of second inclined main grooves that extend while inclining to an other side in the tire circumferential direction and open to the tire equatorial plane and a tire ground contact edge on the other side;
a plurality of first land portions that are defined by a pair of the first inclined main grooves adjacent to each other and by one of the second inclined main grooves, the plurality of first land portions extending from the tire equatorial plane to the tire ground contact edge on the one side; and
a plurality of second land portions that are defined by a pair of the second inclined main grooves adjacent to each other and by one of the first inclined main grooves, the plurality of second land portions extending from the tire equatorial plane to the tire ground contact edge on the other side,
the plurality of first land portions being arrayed adjacent to each other in the tire circumferential direction,
the plurality of second land portions being arrayed adjacent to each other in the tire circumferential direction,
the first land portions and the second land portions being arrayed in a staggered manner along the tire equatorial plane,
the first land portions and the second land portions each comprising a plurality of through grooves that extend therethrough and open to the pair of the first inclined main grooves or the pair of the second inclined main grooves respectively, and a plurality of blocks defined by the through grooves,
the blocks in each of the first land portions and the second land portions comprising center blocks, including a plurality of innermost center blocks in a row in the tire circumferential direction that are defined as blocks closest to the tire equatorial plane and an outer center block that is defined outward in a tire width direction of the innermost center block, and a shoulder block defined as a block closest to the tire ground contact edge,
the innermost center blocks each comprising as edge portion that comprises a first notch portion opening to a connection portion of the inclined main grooves,
the outer center block in each of the first land portions and the second land portions comprising an edge portion that comprises a second notch portion opening to a connection portion of one of the through grooves in each of the first land portions and the second land portions with one of the first inclined main grooves or with one of the second inclined main grooves,
an extension length Wn of the first notch portion of all of the innermost center blocks having a relationship $0.30 \leq Wn/Wb1' \leq 0.50$ with respect to a width Wb1' of the innermost center block at a position where the first notch portion is disposed, and an extension length Wn of the second notch portion of all of the outer center blocks having a relationship $0.30 \leq Wn/Wb1' \leq 0.50$ with respect to a width Wb1' of the outer center block at a position where the second notch portion is disposed, the extension length Wn of the first and second notch portions being measured as an extension distance of the first and second notch portions in a direction of the width Wb1' of the innermost and outer center blocks, and the width Wb1' of the innermost and outer center blocks being defined as a maximum width of the innermost and outer center blocks in a direction orthogonal to an extension direction of the first and second inclined main grooves.

* * * * *